(12) United States Patent
Baird et al.

(10) Patent No.: US 8,877,995 B2
(45) Date of Patent: Nov. 4, 2014

(54) PYROLYSIS FUELS AND METHODS FOR PROCESSING PYROLYSIS FUELS

(75) Inventors: Lance Awender Baird, Prospect Heights, IL (US); Stanley Joseph Frey, Palatine, IL (US)

(73) Assignee: UOP LLC, Des Plaines, IL (US)

( * ) Notice: Subject to any disclaimer, the term of this patent is extended or adjusted under 35 U.S.C. 154(b) by 443 days.

(21) Appl. No.: 13/328,539

(22) Filed: Dec. 16, 2011

(65) Prior Publication Data

US 2013/0152453 A1 Jun. 20, 2013

(51) Int. Cl.
*C10G 1/00* (2006.01)
*C10L 5/00* (2006.01)
*C10L 1/32* (2006.01)

(52) U.S. Cl.
USPC .......... 585/242; 585/1; 585/14; 585/240; 585/241; 201/3; 201/4; 201/7; 201/21; 201/22; 201/30; 44/208; 44/281; 44/282; 44/500; 44/503

(58) Field of Classification Search
USPC .......... 201/3, 4, 7, 21, 22, 30; 585/1, 14, 585/240–242; 44/500, 502, 503, 280–282; 123/1 A
See application file for complete search history.

(56) References Cited

U.S. PATENT DOCUMENTS

| | | | |
|---|---|---|---|
| 4,671,800 A * | 6/1987 | Meyer et al. | 44/281 |
| 4,758,331 A | 7/1988 | Kruse et al. | |
| 5,186,815 A | 2/1993 | Lenglet | |
| 5,713,195 A | 2/1998 | Bronicki et al. | |
| 7,282,189 B2 | 10/2007 | Zauderer | |

OTHER PUBLICATIONS

"Bioslurry as a Fuel. 4. Preparation of Bioslurry Fuels from Biochar and the Bio Oil Rich Fractions after Bio-oil/Biodiesel Extraction" Hanisom Abdullah and Honwei Wu Energy & Fuels 2011 25, 1759-1771 (Feb. 3, 2011).*

"Effects of Temperature on Formation of Lignin-Derived Oligomers during the Fast Pyrolysis of Mallee Woody Biomass" Garcia-Perez, M.; Wang, S., She, J. , Rhodes, M. Lee, W. and Li, C. (2008) 2022-2032.*

Tinaut, F.V., et al., "Effect of biomass particle size and air superficial velocity on the gasification process in a downdraft fixed bed gasifier. An experimental and modelling study," Fuel Processing Technology, vol. 89, No. 11, p. 1076-1089, Nov. 2008.

Boateng, A.A.; "Fast pyrolysis and biooil production from energy crops being developed within USDA-ARS," ACS National Meeting Book of Abstracts, Mar. 2007.

Yorgun, S., et al, "Pyrolysis of sunflower press bagasse: Heating values and energy distribution of the pyrolysis products," Energy Sources, vol. 25, No. 8, p. 809-817, 2003.

* cited by examiner

*Primary Examiner* — Pamela H Weiss
(74) *Attorney, Agent, or Firm* — Mark R Willis

(57) ABSTRACT

Pyrolysis fuels and methods for processing pyrolysis fuel are provided. In one embodiment, a method of processing pyrolysis fuel converts biomass to pyrolysis fuel including pyrolysis oil and char particles. Also, the method includes resizing a portion of the char particles so that substantially all resized char particles have a largest dimension no greater than about 5 microns.

16 Claims, 1 Drawing Sheet

PYROLYSIS FUELS AND METHODS FOR PROCESSING PYROLYSIS FUELS

STATEMENT REGARDING FEDERALLY SPONSORED RESEARCH OR DEVELOPMENT

This invention was made with Government support under DE-EE0002879 awarded by DOE. The Government has certain rights in this invention.

TECHNICAL FIELD

The present disclosure generally relates to pyrolysis fuels and methods for processing pyrolysis fuels, and more particularly relates to pyrolysis fuels including resized char particles and pyrolysis fuel processing methods that resize char particles.

BACKGROUND

Rapid pyrolysis of biomass is a thermal treatment process in the absence of air, which produces char, liquid, and gaseous products. During rapid pyrolysis, the pyrolysis temperatures range from 450° C. to 600° C. and vapor residence times are less than one second to five seconds. In a typical reactor for rapid pyrolysis, a cyclone is used at the termination of the riser reactor to separate sand and char from other pyrolysis products. However, the particle size distribution and density of the char is such that not all of it can be separated by the cyclone. Consequently, the pyrolysis oil product typically contains 0.5 to 4% solids as char.

One of the applications of pyrolysis fuel is combustion in stationary diesel engines. However, stationary diesel engines typically cannot tolerate solids with diameters greater than 5 microns. Because a large percentage of char particles remaining in pyrolysis fuel after pyrolysis have dimensions exceeding 5 microns, the char must typically be removed from the pyrolysis fuel before combustion, often by filtration or by centrifugation.

However, the char has a significant heating value (typically 32 MJ/kg compared to 15 to 20 MJ/kg for the pyrolysis oil), and its removal reduces the heating value of the pyrolysis fuel. Further, because the char cannot be removed without entraining some of the pyrolysis oil in the filter cake or the centrifuge sediment, the char removal process also results in a loss of some pyrolysis oil, typically 3 to 10% of the pre-separation volume of oil.

Accordingly, it is desirable to provide methods for processing pyrolysis fuel, and processed pyrolysis fuel, for use in stationary diesel engines. Further, it is desirable to provide fuel processing methods and fuels that retain the high heating value of the char without causing damage to a diesel engine during combustion. Also, it is desirable to eliminate the loss of pyrolysis oils due to the removal of solids during pyrolysis fuel processing. Further, it is desirable to provide fuel processing methods and fuels with char particles of reduced size. Furthermore, other desirable features and characteristics will become apparent from the subsequent detailed description and the appended claims, taken in conjunction with the accompanying drawings and the foregoing technical field and background.

BRIEF SUMMARY

Pyrolysis fuels and methods for processing pyrolysis fuel are provided. In accordance with an exemplary embodiment, a method for processing pyrolysis fuel converts biomass to pyrolysis fuel including pyrolysis oil and char particles. The method also includes resizing a portion of the char particles from the pyrolysis fuel. Substantially all resized char particles have a largest dimension no greater than about 5 microns.

In accordance with another exemplary embodiment, a method is provided for processing pyrolysis fuel including pyrolysis oil and char particles. The method includes resizing char particles from the pyrolysis fuel. Also, the method provides for combusting the pyrolysis fuel, including the pyrolysis oil and resized char particles.

In accordance with another exemplary embodiment, pyrolysis fuel for combustion in a diesel engine is provided. The pyrolysis fuel includes pyrolysis oil formed from rapid pyrolysis of biomass. Also, the pyrolysis fuel includes resized char particles formed from rapid pyrolysis of biomass. The resized char particles have a largest dimension no greater than about 5 microns.

BRIEF DESCRIPTION OF THE DRAWINGS

The processed pyrolysis fuels and methods for processing pyrolysis fuel will hereinafter be described in conjunction with the following drawing figures, wherein like numerals denote like elements, and wherein.

DETAILED DESCRIPTION

The following Detailed Description is merely exemplary in nature and is not intended to limit the pyrolysis fuels or methods of processing pyrolysis fuel. Furthermore, there is no intention to be bound by any expressed or implied theory presented in the preceding technical field, background or brief summary, or in the following detailed description.

Various methods for processing pyrolysis fuel are provided herein. The methods can be employed in processing biomass-derived pyrolysis fuel to resize char particles to sizes suitable for combustion within a diesel engine, or in other apparatuses limited to use with small diameter particles. Further, the methods enhance the heating value of pyrolysis fuel over pyrolysis fuels formulated through current processing methods. As a result, the methods contemplated herein increase the yield of pyrolysis fuel delivered to an engine for a given quantity of biomass. In certain embodiments, the overall yield of electricity per unit of biomass energy fed to the pyrolysis processing apparatus is increased by 5% or more over current processing methods.

As used herein, "char" refers to the carbonaceous solid matter formed during rapid thermal pyrolysis of biomass, and typically includes all compounds in the biomass feedstock that do not vaporize in the pyrolysis reactor. State of the art processing typically removes char from the pyrolysis fuel due to catalytic effects of the char causing poor stability of the pyrolysis fuel.

Figure 1:
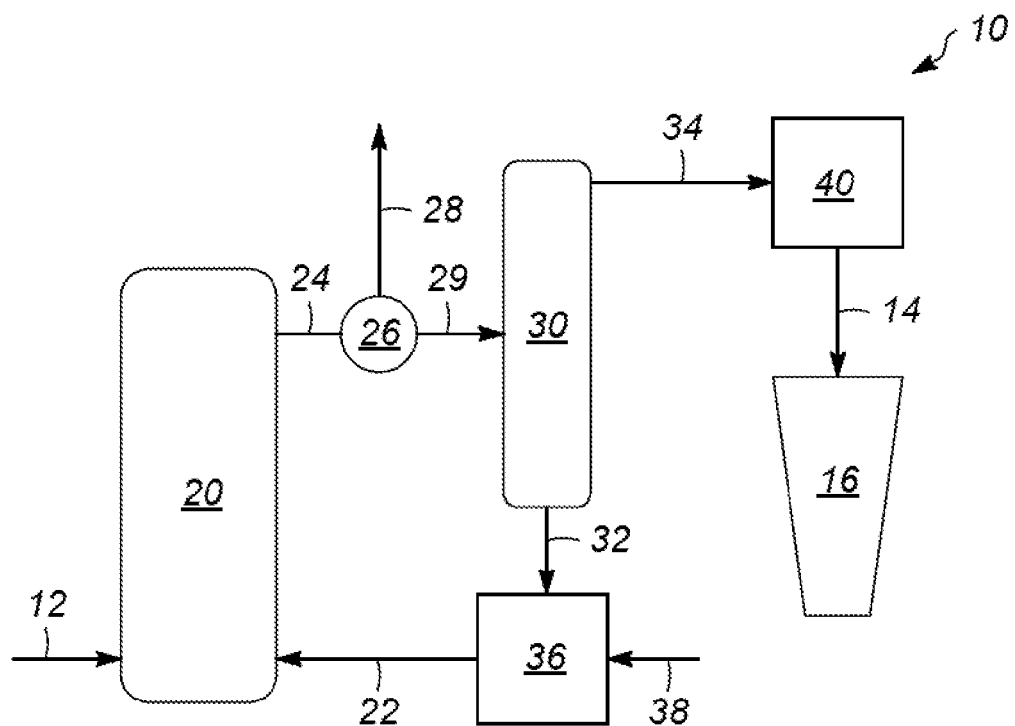
FIG. 1 is a schematic illustration of an apparatus for processing biomass into pyrolysis fuel for use in a diesel engine in accordance with an embodiment herein.

In accordance with an exemplary embodiment, FIG. 1 illustrates an apparatus 10 for processing biomass 12 into a pyrolysis fuel product 14 suitable for combustion in a combustion unit 16, such as stationary diesel engine. While FIG. 1 depicts a flow of pyrolysis fuel product 14 directly to the combustion unit, it is contemplated that the pyrolysis fuel product 14 be stored, transported, or otherwise handled before being utilized for combustion.

In FIG. 1, the biomass 12 is fed into a rapid pyrolysis reactor 20. The reactor 20 also receives a stream 22 of heated sand and recycle gas, preferably at a temperature of about 460° C. to about 550° C., such as about 480° C. to about 510° C. Upon contact with the heated stream 22, the biomass 12 is largely vaporized, resulting in a stream 24 of sand and pyrolysis fuel that is, for a good grade of biomass feedstock, typically formed by about 70% liquid, about 15% gas, and about 15% char. For other feedstocks, the stream 24 may comprise between about 50% to about 75% liquid, about 10% to about 25% gas, and about 10% to about 20% char. As shown, the stream 24 is fed from the reactor 20 to a condensing section 26 that separates pyrolysis gas fuel 28 from the pyrolysis fuel stream 29. The pyrolysis fuel stream 29 is then delivered to a separator unit 30, such as a cyclone.

The separator unit 30 separates stream 29 into a solid stream 32, comprised of sand and a first portion of char (for example, about 85% to about 97%, or about 90% to about 95%, of the char), and a pyrolysis fuel stream 34, comprised of the pyrolysis oil and a second portion of char (typically about 3% to about 15% of the char, for example about 5% to about 10%).

In FIG. 1, the solid stream 32 is fed to a reheater 36. Air 38 is also delivered to the reheater 36. Introduction of air 38 to the stream 32 causes ignition and combustion of the char therein which heats the sand to necessary temperatures for the pyrolysis reactor 20. The hot sand is then delivered back to the pyrolysis reactor 20 in heated stream 22 along with recycle gas.

Meanwhile, the pyrolysis fuel stream 34 flows from the separator unit 30 to a processing unit 40 which prepares the pyrolysis fuel product 14 for use in the combustion unit 16. Specifically, the processing unit 40 resizes the char particles within the pyrolysis fuel stream 34 to sizes appropriate for introduction to the combustion unit 16. In an embodiment, the char particles are resized to have a largest diameter of less than about 20 microns, for example less than about 10 microns, such as less than about 5 microns, or less than about 3 microns. Typically, the resulting pyrolysis fuel product 14 has a total solids content of less than about 4 wt %.

FIG. 1 depicts pyrolysis fuel stream 34 being delivered and processed by processing unit 40. In an exemplary embodiment, the processing unit is a grinder, such as a ball mill grinder. A typical ball mill grinder includes a rotatable cylindrical conduit that is partially filled with balls, such as zirconium balls having a diameter of 5 mm. The balls typically fill about one-third to about one-half of the conduit. The downstream end of the conduit is closed by a screen with openings having a diameter equal to the preferred maximum dimension of the char particles. When the pyrolysis fuel stream flows through the ball mill grinder, the cylinder is rotated along its axis, causing the balls to roll or shift and fall onto or pinch particles within the pyrolysis fuel stream. As a result of the impact of the balls on the particles, the particles are broken and resized into smaller particles. Further, the particles cannot exit the cylinder until they are resized to have a greatest dimension shorter than the diameter of the openings in the screen. As a result of the processing unit 40, the pyrolysis fuel product 14 includes pyrolysis oil and char particles that are substantially all smaller than the desired maximum dimension. Therefore, the pyrolysis fuel product is appropriate for introduction to and combustion in the combustion unit 16.

Figure 2:
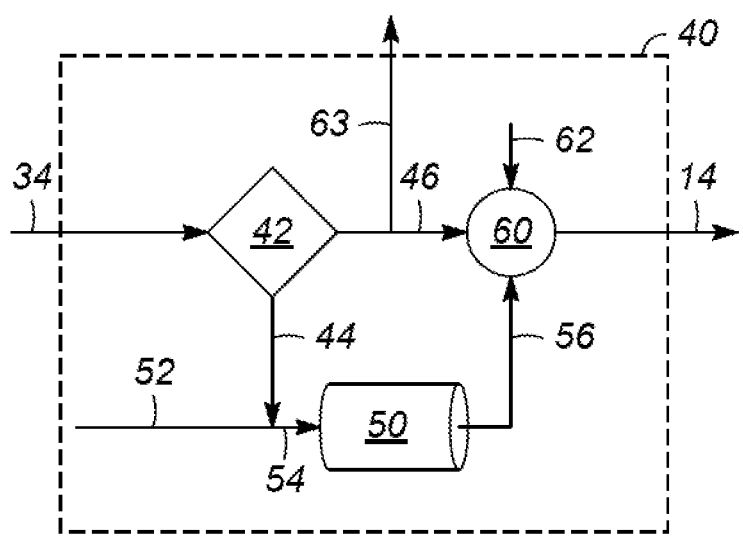
FIG. 2 is a schematic illustration of an apparatus for processing pyrolysis fuel in accordance with various embodiments herein.

FIG. 2 shows an alternate fuel processing unit 40. As shown, the fuel processing unit 40 in FIG. 2 includes a separator 42, such as a filter or a centrifugal separator. The separator 42 receives the pyrolysis fuel stream 34 from the separator unit 30 and separates the char particles 44 from the pyrolysis oil 46. The char particles 44 are fed to a resizing unit 50, such as the ball mill grinder discussed above. In order to facilitate flow of the char particles 44 through the resizing unit 50, the particles 44 may be slurried with a stream 52 including ethanol, pyrolysis oil, or another liquid fuel compatible with pyrolysis oil and suitable for combustion in the combustion unit 16. The slurry 54, formed by slurrying the particles 44 with the stream 52, flows through the resizing unit 50, where the particles are resized to have the desired maximum dimension for use in the combustion unit 16.

After resizing, the stream 56 of resized char particles (and the slurrying liquid 52, if utilized) flows from the resizing unit 50 to a blender 60. The blender also receives at least a portion of the pyrolysis oil 46 from the separator 42. In the blender 60, the stream 56 is blended back into the pyrolysis oil 46. In certain embodiments, a surfactant or other suspension agent 62 may be added to the blender 60 to aid in blending the resized particles of stream 56 with the pyrolysis oil 46. As a result of blending in blender 60, the pyrolysis fuel product 14 appropriate for combustion in combustion unit 16 is formed. In an exemplary embodiment, the pyrolysis fuel product 14 includes pyrolysis oil formed from rapid pyrolysis of biomass and resized char particles formed from rapid pyrolysis of biomass, wherein the resized char particles have a largest dimension no greater than about 5 microns.

In certain embodiments, a stream 63 may be taken from pyrolysis oil 46 for use without blending with the resized char particles 56. As a result, the pyrolysis oil 46 that is blended with the stream 56 will have a higher solids content, while the stream 63 is relatively solids free.

In an exemplary method for processing pyrolysis fuel, biomass is converted to pyrolysis fuel including pyrolysis oil and char particles. Specifically, the biomass is rapidly pyrolyzed to form pyrolysis fuel including pyrolysis oil and a plurality of char particles having a particle size distribution. A first portion of char particles is removed from the pyrolysis fuel, such as by a cyclone. Thereafter, a second portion of the char particles are resized to have a largest dimension no greater than about 5 microns. In certain embodiments, the second portion of char particles may be resized while in the stream of pyrolysis fuel. In other embodiments, the second portion of char particles is separated from the pyrolysis fuel, such as by centrifugal separation. Alternatively, a portion of the pyrolysis fuel may be present in the gas phase, and the char particles may be separated from the pyrolysis fuel in the gas phase by hot gas filtration.

According to the exemplary method, the separated char particles are then resized. For resizing, the char particles may be slurried with a liquid such as ethanol, pyrolysis oil, or another fuel compatible with pyrolysis oil and suitable for combustion in a combustion unit such as a stationary diesel engine. Whether slurried or not, the resized char particles are blended with the pyrolysis oil to create a blended pyrolysis fuel having a total solids content below about 4 wt %. The method may conclude with combusting the pyrolysis fuel, including the pyrolysis oil and resized char particles, in the combustion unit.

As a result of the processing contemplated herein, the pyrolysis fuel product includes the heating value of the char particles that flow out of the cyclone separation unit with the pyrolysis oil. Further, no pyrolysis oil is lost due to steps for removing the large char particles from the pyrolysis fuel. The resulting pyrolysis fuel product is also appropriate for use in combustion units such as stationary diesel engines without causing damage thereto.

While at least one exemplary embodiment has been presented in the foregoing detailed description, it should be appreciated that a vast number of variations exist. It should also be appreciated that the exemplary embodiment or embodiments described herein are not intended to limit the scope, applicability, or configuration of the claimed subject matter in any way. Rather, the foregoing detailed description will provide those skilled in the art with a convenient road map for implementing the described embodiment or embodiments. It should be understood that various changes can be made in the processes without departing from the scope defined by the claims, which includes known equivalents and foreseeable equivalents at the time of filing this patent application.

What is claimed is:

1. A method for processing pyrolysis fuel comprising:
converting biomass to pyrolysis fuel including pyrolysis oil and char particles; and
resizing a portion of the char particles, wherein substantially all resized char particles have a largest dimension no greater than about 5 microns;
separating the portion of char particles from the pyrolysis fuel before resizing, wherein the separating comprises filtering the char particles from the pyrolysis fuel; and
blending the resized char particles with at least a portion of the pyrolysis fuel after resizing.

2. The method of claim 1 wherein converting comprises rapidly pyrolyzing biomass to form the pyrolysis fuel including pyrolysis oil and char particles.

3. The method of claim 1 wherein the resized portion of the char particles is a first portion of the char particles, and wherein the method further includes removing a second portion of the char particles from the pyrolysis fuel before resizing.

4. The method of claim 1 further comprising combusting the pyrolysis fuel, including the pyrolysis oil and resized char particles.

5. The method of claim 1
wherein the blending of the resized char particles with at least a portion of the pyrolysis fuel after resizing creates a blended pyrolysis fuel having a total solids content below 4 wt %.

6. The method of claim 5 further comprising slurrying the separated portion of char particles with a liquid to form a slurry before resizing.

7. A method for processing pyrolysis fuel comprising:
converting biomass to pyrolysis fuel including pyrolysis oil and char particles;
separating a portion of char particles from the pyrolysis fuel;
slurrying the separated portion of char particles with a liquid to form a slurry;
resizing the portion of the char particles, wherein substantially all resized char particles have a largest dimension no greater than about 5 microns, and wherein the resizing comprises passing the slurry through a ball mill grinder;
blending the resized char particles with at least a portion of the pyrolysis fuel after resizing to create a blended pyrolysis fuel having total solids content below 4 wt %.

8. The method of claim 7 wherein converting comprises rapidly pyrolyzing biomass to form the pyrolysis fuel including pyrolysis oil and char particles.

9. The method of claim 7 wherein the resized portion of the char particles is a first portion of the char particles, and wherein the method further includes removing a second portion of the char particles from the pyrolysis fuel before resizing.

10. The method of claim 7 further comprising combusting the blended pyrolysis fuel, including the pyrolysis oil and resized char particles.

11. A method for processing pyrolysis fuel comprising:
converting biomass to pyrolysis fuel including pyrolysis oil and char particles;
separating by centrifuge a portion of char particles from the pyrolysis fuel;
resizing the portion of the char particles, wherein substantially all resized char particles have a largest dimension no greater than about 5 microns; and
blending the resized char particles with at least a portion of the pyrolysis fuel.

12. The method of claim 11 wherein converting comprises rapidly pyrolyzing biomass to form the pyrolysis fuel including pyrolysis oil and char particles.

13. The method of claim 11 wherein the resized portion of the char particles is a first portion of the char particles, and wherein the method further includes removing a second portion of the char particles from the pyrolysis fuel before resizing.

14. The method of claim 11 further comprising combusting the pyrolysis fuel, including the pyrolysis oil and resized char particles.

15. The method of claim 11 wherein the blending the resized char particles with at least a portion of the pyrolysis fuel after resizing creates a blended pyrolysis fuel having a total solids content below 4 wt %.

16. The method of claim 11 further comprising slurrying the separated portion of char particles with a liquid to form a slurry before resizing.

* * * * *